(12) United States Patent
Caragol

(10) Patent No.: US 9,436,771 B1
(45) Date of Patent: Sep. 6, 2016

(54) INFORMATIVE SYSTEMS AND METHODS FOR PERISHABLE FOOD STORAGE

(71) Applicant: Ri Alberto Caragol, Indianapolis, IN (US)

(72) Inventor: Ri Alberto Caragol, Indianapolis, IN (US)

( * ) Notice: Subject to any disclaimer, the term of this patent is extended or adjusted under 35 U.S.C. 154(b) by 0 days.

(21) Appl. No.: 14/678,961

(22) Filed: Apr. 4, 2015

(51) Int. Cl.
*G06F 19/00* (2011.01)
*G06F 17/30* (2006.01)

(52) U.S. Cl.
CPC ................... *G06F 17/30879* (2013.01)

(58) Field of Classification Search
CPC ........... G06K 19/00; G06K 19/06028; G06K 19/06037
USPC .................................................. 235/375, 385
See application file for complete search history.

(56) References Cited

U.S. PATENT DOCUMENTS

| | | | | |
|---|---|---|---|---|
| 8,464,952 | B2 * | 6/2013 | Chernyakov | G06K 7/10564 235/454 |
| 9,171,300 | B2 * | 10/2015 | Westby | G06Q 10/087 |
| 2014/0091136 | A1 * | 4/2014 | Ybarra, Jr. | G06F 17/30879 235/375 |

* cited by examiner

*Primary Examiner* — Seung Lee

(57) ABSTRACT

An informative food storage system and method is presented herein. The system comprising a container with a scannable code and a client device configured to record the scannable code and to access or maintain a database comprising information associated with one or more scannable codes. The client device may be configured to create, edit, delete, and display information associated with each scannable code. The information may comprise a plurality of data on food stored in the container comprising the scannable code and on the container itself. The method may comprise storing food in a container comprising a scannable code. The scannable code may be recorded by an informative food storage system. Information associated with the scannable code may be displayed, edited, and maintained in a database with information on each scannable code stored in an account or refrigerator. Information from the database may be input, edited, and output by the system on a client device.

5 Claims, 7 Drawing Sheets

INFORMATIVE SYSTEMS AND METHODS FOR PERISHABLE FOOD STORAGE

FIELD OF THE INVENTION

The present invention relates to food storage. More specifically, the invention relates to informative systems and methods for perishable food storage.

BACKGROUND

Refrigeration of food as a way to prevent spoilage is widely known in the art. Consumers commonly refrigerate food items in a plurality of containers as a method to prevent and slow food spoilage. However, over time, the food contents of the containers will eventually spoil and be thrown away as waste. In some circumstances spoiled food waste may be attributed to a consumer forgetting the date on which a particular container was placed in the refrigerator and therefore failing to consume the food prior to spoiling. In other circumstances, spoiled food waste may be attributed to a consumer forgetting what food items are stored in their refrigerator as containers become placed behind other containers and hidden from view.

Food waste generated due to a lack of information and visibility regarding temperature controlled and non-temperature controlled stored food has many financial and ecological repercussions that have a negative impact on individual families and the planet earth as a whole. According to the Natural Resource Defense Council (NRDC) a typical household in the United States of America throws out 25% of the food they buy, for a family of four this translates to an estimated $1365 to $2,275 monetary loss per year. In addition to the monetary loss, wasting food results in wasting all the resources used for the production and delivery of this food, resources like water, energy and gasoline for transportation, which in turn drives up food prices for everyone.

Therefore, a need exists for novel informative systems and methods for perishable food storage. There also exists a need for novel systems and methods for perishable food storage that are able to inform a user of the amount of time a food item has been stored in a refrigerator. There is a further need for novel systems and methods for perishable food storage that are able to inform a user of the food contents of containers within a refrigerator even if the containers are hidden from view. Finally, there exists a need for novel systems and methods for perishable food storage that are able to provide information on stored food items and reduce the amount of spoiled food waste.

BRIEF SUMMARY OF THE INVENTION

It is one aspect of the present invention to provide a novel systems and methods for perishable food storage.

Another object of the present invention is to provide systems and methods for perishable food storage that are able to inform a user of the amount of time a food item has been stored in a refrigerator.

An additional object of the present invention is to provide systems and methods for perishable food storage that are able to inform a user of the food contents of containers within a refrigerator even if the containers are hidden from view.

It is a further object of the present invention to provide systems and methods for perishable food storage that are able to provide information on stored food items and reduce the amount of spoiled food waste.

In preferred embodiments, the system comprises: a container comprising a scannable code and a client device configured to record the scannable code and to access or maintain a database comprising information associated with one or more scannable codes. The client device may be configured to create, edit, delete, and display information associated with each scannable code. The information may comprise a plurality of data on food stored in the container comprising the scannable code and on the container itself.

According to one aspect consistent with the principles of the invention, a method for informative food storage is provided. The method may include storing food in a container comprising a scannable code such as a QR code or a bar code. The scannable code may be recorded by an informative food storage system. Information associated with the scannable code may be displayed and edited. The information may comprise the type of food, the name of the food, time and date the food was prepared and placed into storage, a predicted spoilage date, an alarm, a reminder, nutrition information, and/or a picture of the food in the container comprising a scannable code. The system may be configured to maintain a database with information on each scannable code stored in a refrigerator. Information from the database may be input, edited, output, or otherwise manipulated by the system on a client device.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1:
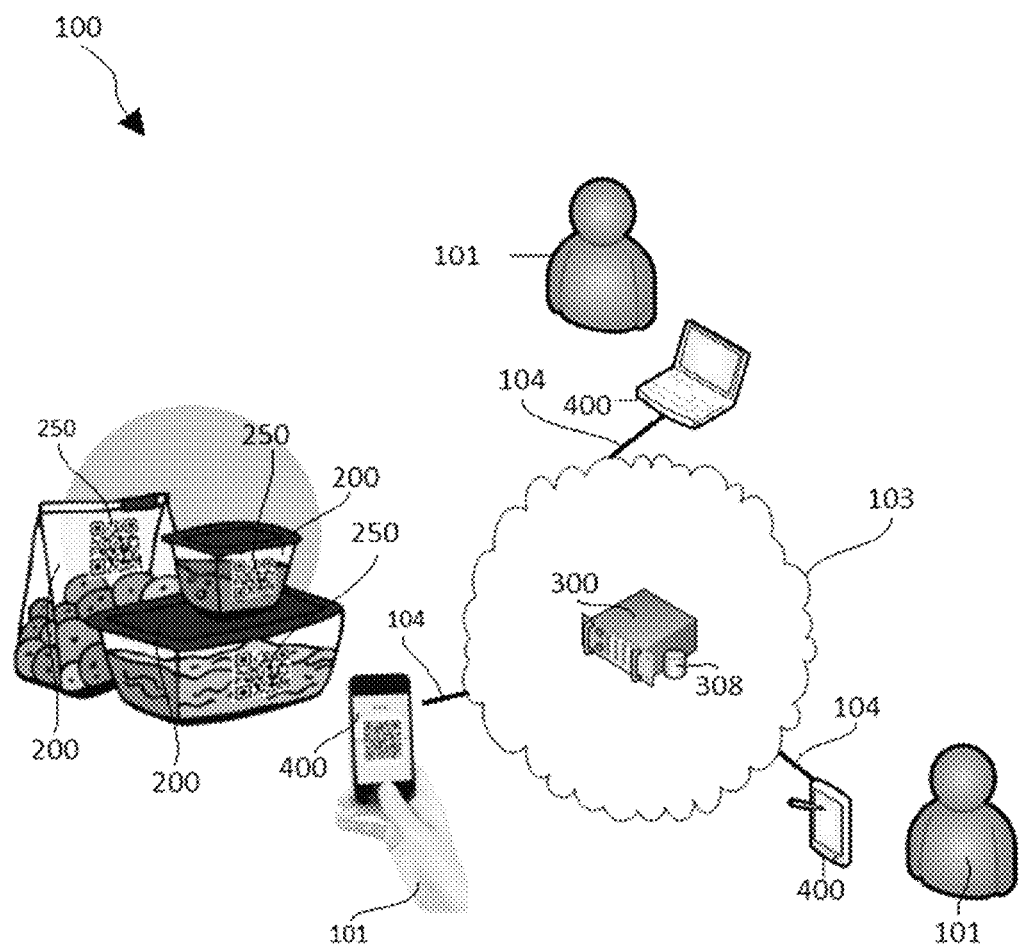
FIG. 1 shows an illustrative example of some of the components and computer implemented methods which may be found in a system according to various embodiments described herein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

DEFINITIONS

As used herein, the term "computer" refers to a machine, apparatus, or device that is capable of accepting and performing logic operations from software code. The term "software", "software code" or "computer software" refers to any set of instructions operable to cause a computer to perform an operation. Software code may be operated on by a "rules engine" or processor. Thus, the methods and systems of the present invention may be performed by a computer based on instructions received by computer software.

The term "client device" or sometime "electronic device" or just "device" as used herein is a type of computer generally operated by a person. In some preferred embodiments, a client device is a smart phone configured to take images and videos of users and transmit those images and videos to a server which may be operated locally or in the cloud. In other embodiments, a client device may be a type of scanning device configured to record scannable codes by emitting electromagnetic radiation and then recording the radiation reflected of the scannable code with an optical or other sensor. The client device may optionally be configured to be permanently or temporarily positioned on or near a food storage space such as a refrigeration unit or storage cabinet. Non-limiting examples of client devices include; personal computers (PCs), workstations, laptops, tablet PCs including the iPad, cell phones including iOS phones made by Apple Inc., Android OS phones, Microsoft OS phones, Blackberry phones, or generally any electronic device capable of running computer software and displaying information to a user. Certain types of client devices which are portable and easily carried by a person from one location to another may sometimes be referred to as a "mobile device" or "portable device". Some non-limiting examples of mobile devices include; cell phones, smart phones, tablet computers, laptop computers, wearable computers such as watches, Google Glasses, etc. and the like.

The term "computer readable medium" as used herein refers to any medium that participates in providing instructions to the processor for execution. A computer readable medium may take many forms, including but not limited to, non-volatile media, volatile media, and transmission media. Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Transmission media may also take the form of acoustic or light waves, such as those generated during radio wave and infrared data communications.

As used herein the term "data network" or "network" shall mean an infrastructure capable of connecting two or more computers such as client devices either using wires or wirelessly allowing them to transmit and receive data. Non-limiting examples of data networks may include the internet or wireless networks or (i.e. a "wireless network") which may include wifi and cellular networks.

As used herein, the term "database" shall generally mean a digital collection of data or information. The present invention uses novel methods and processes to store, link, and modify information such digital images and videos and user profile information. For the purposes of the present disclosure, a database may be stored on a remote server and accessed by a client device through the internet (i.e., the database is in the cloud) or alternatively in some embodiments the database may be stored on the client device or remote computer itself (i.e., local storage). A "data store" as used herein may contain or comprise a database (i.e. information and data from a database may be recorded into a medium on a data store).

The present disclosure is to be considered as an exemplification of the invention, and is not intended to limit the invention to the specific embodiments illustrated by the figures or description below.

As perhaps best shown by FIG. 1, in some embodiments, the present invention comprises novel informative systems and methods for food storage through a data network. In preferred embodiments, a computer implemented system ("the system") 100 for informative food storage across a network or the cloud 103 may comprise one or more client devices 400. The client devices 400 preferably comprise a camera, which may be used to record and create image files or videos, and a network link 104, which may be used to upload those image files or videos to a server 300, with an attached data store 308, in the cloud 103 or in some cases directly to other client devices 400. Users 101 operating client devices 400 may access, share, edit, or even download information, images, and other data that may be associated with a scannable code 250 through their respective network link 104 from a server 300 preferably with appropriate permission and privacy verifications.

The system 100 also comprises one or more containers 200 configured to store perishable food items, with each container 200 comprising a scannable code 250 or other indicia which may be recognized by a computer such as a mobile device. Containers 200 may include but are not limited to substantially rigid containers generally resembling Tupperware®, jars, bottles, canisters, and the like.

Additionally, containers 200 may include but are not limited to substantially non-rigid containers and food coverings such as plastic bags, plastic wrap, aluminum foil, tinfoil, wax paper, and the like. In other embodiments, the container 200 may include any other type of food storage device.

A client device 400 comprising a camera may be configured to record the scannable code 250 of a container 200 and be configured to access or maintain a database comprising information associated with one or more scannable codes 250. The client device 400 may be configured to create, edit, delete, and display information associated with each scannable code 250. The information may comprise a plurality of data on food stored in the container 200 comprising the scannable code 250 and on the container 200 itself. Embodiments of scannable codes 250 may include bar codes, QR-codes, Datamatrix, Microsoft tags, Cool-Data-Matrix, Aztec, Upcodes, Trilcodes, Quickmarks, Shotcodes, mCodes, Beetaggs, or any other identifying graphic or idicia of which an image may be taken and information associated therewith.

Each scannable code may be recognized by computer software (e.g. QR readers, bar code readers, etc.) to extract a code such as an alphanumeric string wherein each code may be associated with information about the container 200 and its food items. Information associated with a scannable code 250 may be displayed and edited by a client device 400. Each scannable code 250 may have a unique web or internet address programmed once a camera of a client device 400 has recorded the scannable code 250. This web address may be accessed and edited by a program or web browser running on a client device 400. The information may include the type of food, the name of the food, time and date the food was prepared and placed into storage, a predicted spoilage date, nutrition information, and/or a picture of the food in the container 200 comprising a scannable code 250. In preferred embodiments, when food is initially to be placed in a container 200 the scannable code 250 is recorded and a form is pre-populated with information such as the food insertion date. This information as well as other user entered data may be maintained on a database on a client device 400 and/or on a server 300 in the cloud 103. Also in some embodiments, the system 100 may suggest potential expiration and use by dates for the food items stored in a container 200, and provide alarms or reminders on a client device 400 on or prior to an expiration or use by date.

In preferred embodiments, the scannable code 250 may be permanently attached to a container 200 by being etched, heat bonded, chemically bonded, integrally formed or molded into the container 200, or with any other suitable permanent or substantially permanent attachment method. In other embodiments, the scannable code 250 may be temporarily attached to a container 200 with a removable adhesive, static cling adhesive, decal, or any other suitable temporary or substantially temporary attachment method.

In other embodiments, a scannable code 250 such as a Universal Product Code (UPC) bar code supplied by and affixed to a food container 200 may be scanned by a client device. In these embodiments, the food item may not be required to be added to another container 200 comprising a scannable code 250 and the UPC code common to consumer food containers 200 may instead be recorded by a client device 400 and a form may be pre-populated with information such as the food insertion and expiration date. This information as well as other user entered data, including notifications and alarms may be maintained on a database on a client device 400 and/or on a server 300 in the cloud 103.

In some embodiments, the permission and privacy verifications may be granted to a client device 400 based on an account with login credentials such as login IDs and passwords allowing more than one client device 400 to access the system 100. In preferred embodiments, a group of users 101 with access to a refrigerator may create an account specific to that refrigerator allowing users 101 within the group sole access to the information such as a listing of all the containers 200 with food items and information on the food items, of the specific refrigerator. In some embodiments, the system 100 may keep a record of the amount of food that an account has sparred from being thrown away and provide a corresponding monetary value approximation saved by sparing the food. In further embodiments, the system 100 may maintain a cumulative record of information on every container 200 and food item ever stored within.

In some embodiments, a user 101 may first capture an image of a scannable code 102, such as a QR code, using a portable electronic device 400(*a*) to open up a marketplace (e.g. an app store) to download or purchase a software application (an "app") which may be configured to run various aspects of the system 100.

Figure 2:
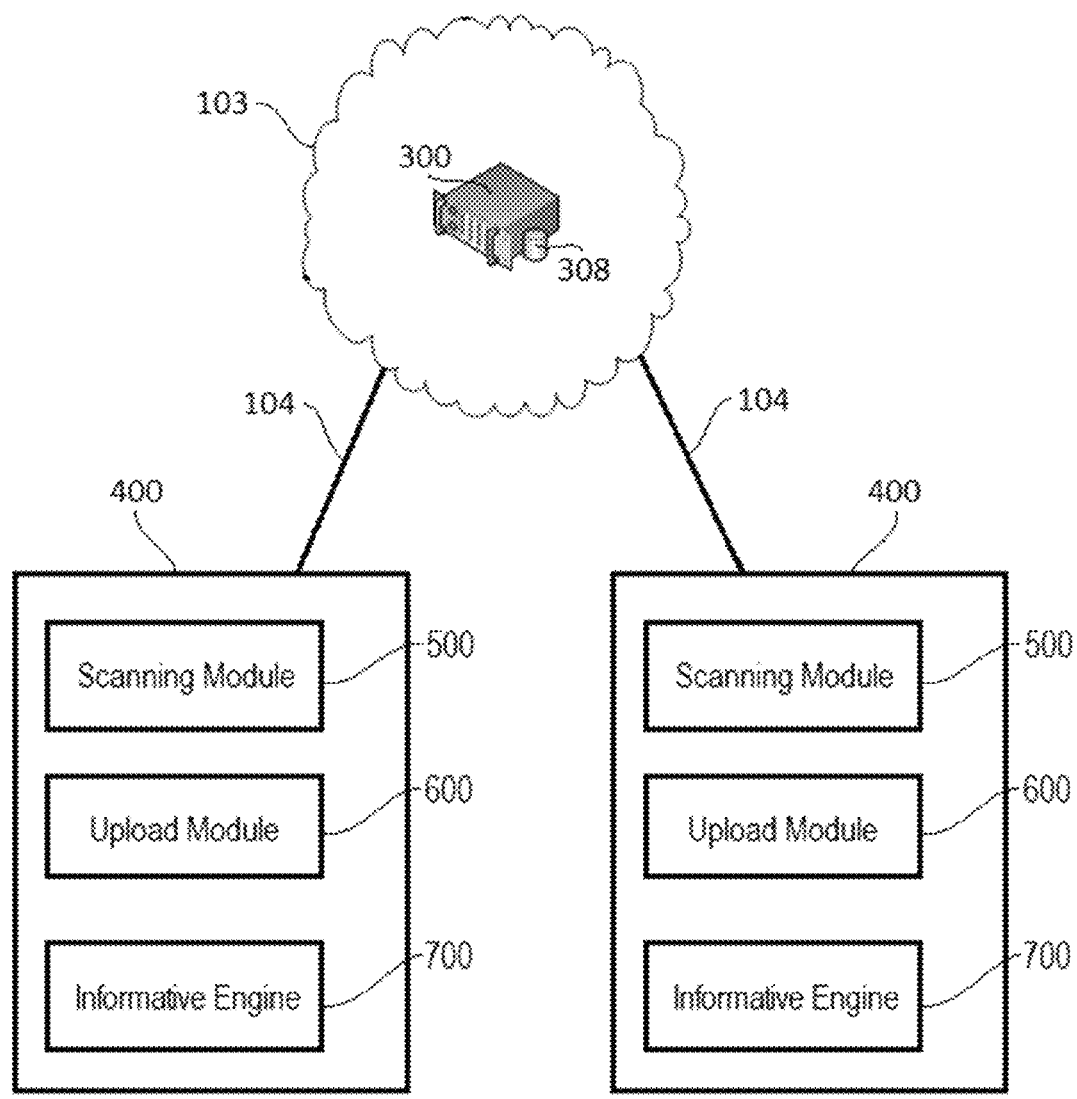
FIG. 2 illustrates an example of some of the modules and engines which may be found in a system according to various embodiments described herein.

FIG. 2 illustrates an example of some of the modules and engines which may be found in a system 100 (FIG. 1) according to various embodiments. One or more client devices 400 may be configured to run one or more programs such as a scanning module 500, upload module 600, and an informative engine 700.

The scanning module 500 program may be configured to access the camera of a client device 400 and record images of a scannable code 250 (FIG. 1), food items stored to be stored or already stored in a container 200 (FIG. 1), or any other image or video desired by a user 101 (FIG. 1). The scanning module 500 may display these images on the input/output interfaces 404 (FIG. 4) of a client device 400 and provide these images to the informative engine 700 and/or upload module 600.

The upload module 600 program may be configured to transmit one or more information, image, or video files on a client device 400 through their respective network link 104 to a server 300 in the cloud 103. Additionally in some embodiments, the upload module 600 may send information, images, and videos to another client device 400 for storage. In some embodiments, the upload module 600 program may also be configured to request and download one or more information, image, or video files on a client device 400 through their respective network link 104 from a server 300 in the cloud 103. In preferred embodiments, only client devices 400 granted the permission and privacy verifications to a specific account may download from a server 300 information, image, or video files specific to an event. In other embodiments, only client devices 400 granted the permission and privacy verifications to a specific account may transmit, download, or otherwise manipulate from a server 300 information, image, or video files specific to that account.

The informative engine 700 may be configured to associate information, image, or video files with a specific scannable code and allow the information and files to be manipulated by a user through an input/output interface 404 (FIG. 4) of a client device 400. The informative engine 700 may be configured to create, edit, delete, display, or otherwise manipulate information and files associated with each scannable code 250 (FIG. 1). The information may comprise a plurality of data on food stored in the container 200 comprising the scannable code 250 (FIG. 1) and on the container 200 (FIG. 1) itself. Such information may include the type of food, the name of the food, time and date the food was prepared and placed into storage, a predicted spoilage date, nutrition information, and/or a picture of the food in the container 200 (FIG. 1) comprising a scannable code 250 (FIG. 1). In preferred embodiments, the informative engine 700 may be configured to alert a user 101 (FIG. 1) through an input/output interface 404 (FIG. 4) of a client device 400 to prior to, on, or after a specified date such as a use by or discard by date selected by the user 101 (FIG. 1).

The informative engine 700 may be configured to receive one or more, information, image, or video files from a scanning module 500 on a client device 400 or server 300 through their respective network link 104. In some embodiments, the smart curation and transmission engine 700 may be configured to run on a server 300 in the cloud 103 and/or to run on a client device 400. The informative engine 700 program may be configured to receive one or more information, image, or video files that have been associated with a specific scannable code 250 (FIG. 1) and add them to a data store 308 associated with a specific account. In preferred embodiments, the informative engine 700 may be configured to transmit information, image, or video files from a specific account to a client device 400 that has been granted the permission and privacy verifications to a specific account.

Figure 3:
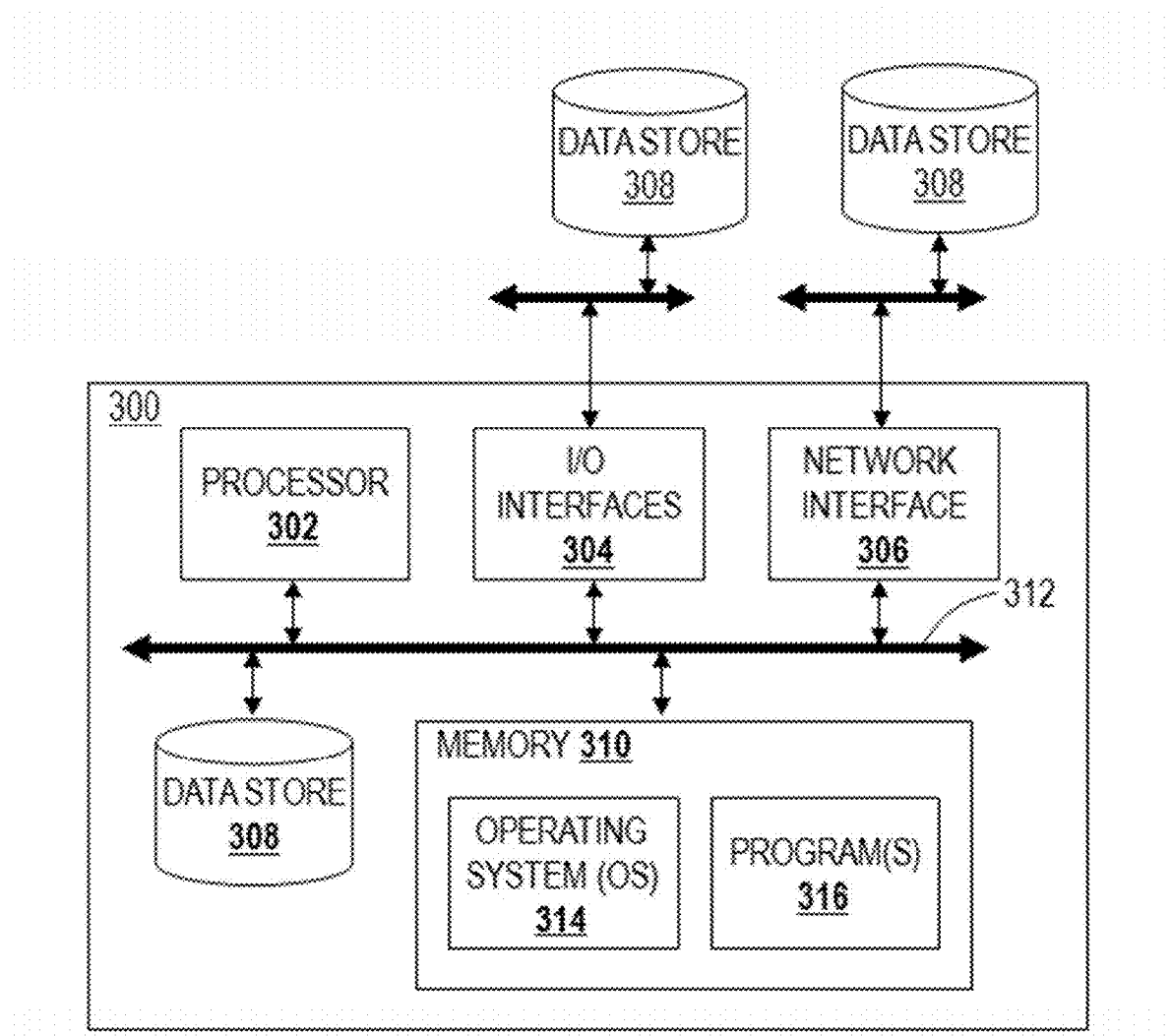
FIG. 3 depicts a block diagram showing an example of a server which may be used by the system as described in various embodiments herein.

Referring now to FIG. 3, in an exemplary embodiment, a block diagram illustrates a server 300 which may be used in the system 100 or standalone. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the WAN 101, the enterprise 200, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 may include a suitable operating system (O/S) 314 and one or more programs 316. The operating system 314 essentially controls the execution of other computer programs, such as the one or more programs 316, and provides scheduling, input-output control, file and data management, memory management, and communication control and related services. The operating system 314 may be, for example Windows NT, Windows 2000, Windows XP, Windows Vista, Windows 7, Windows 8, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C. and various other vendors), Android and variants thereof (available from Google, Inc. of Mountain View, Calif.), Apple OS X and variants thereof (available from Apple, Inc. of Cupertino, Calif.), or the like. The one or more programs 316 may be configured to implement the various processes, algorithms, methods, techniques, etc. described herein.

Figure 4:
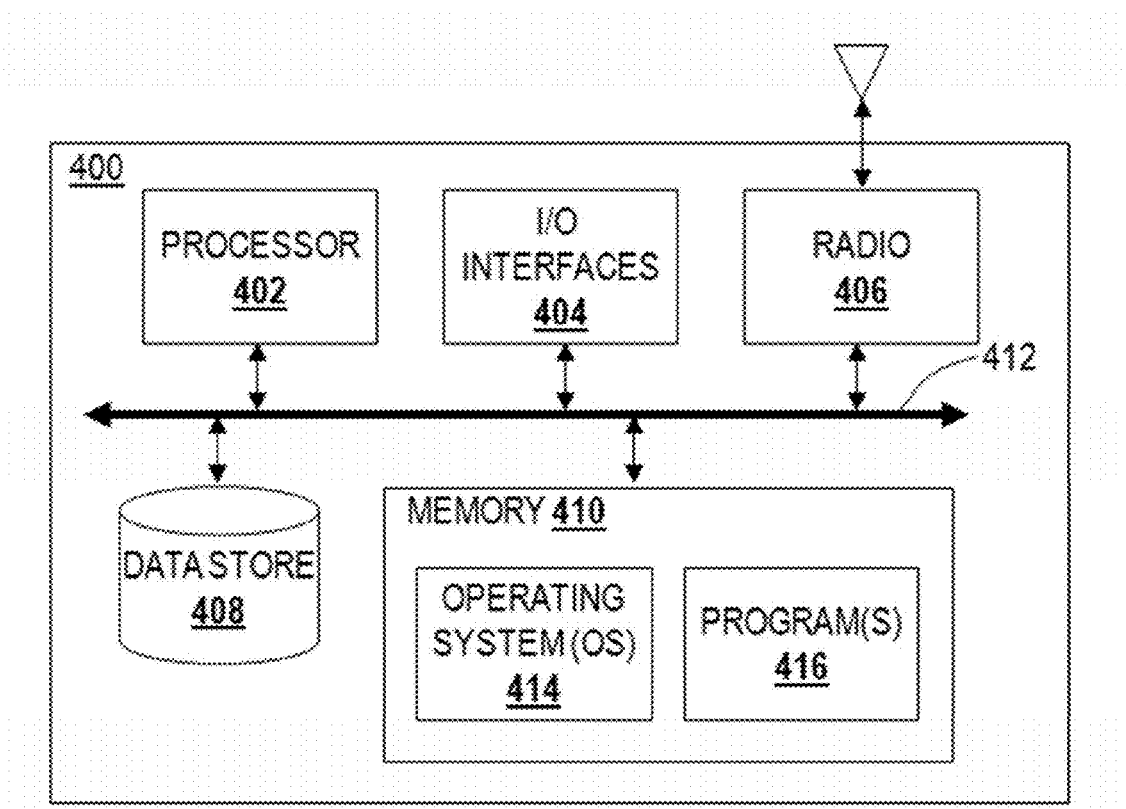
FIG. 4 shows a block diagram illustrating an example of a client device or machine such as a smart phone which may be used by the system as described in various embodiments herein.

Referring to FIG. 4, in an exemplary embodiment, a block diagram illustrates a client device 400, which may be used in the system 100 or the like. The client device 400 can be a digital device that, in terms of hardware architecture, generally includes a processor 412, input/output (I/O) interfaces 414, a radio 416, a data store 418, and memory 422. It should be appreciated by those of ordinary skill in the art that FIG. 4 depicts the client device 400 in an oversimplified manner, and a practical embodiment may include additional components and suitably configured processing logic to support known or conventional operating features that are not described in detail herein. The components (412, 414, 416, 418, and 422) are communicatively coupled via a local interface 424. The local interface 424 can be, for example but not limited to, one or more buses or other wired or wireless connections, as is known in the art. The local interface 424 can have additional elements, which are omitted for simplicity, such as controllers, buffers (caches), drivers, repeaters, and receivers, among many others, to enable communications. Further, the local interface 424 may include address, control, and/or data connections to enable appropriate communications among the aforementioned components.

The processor 412 is a hardware device for executing software instructions. The processor 412 can be any custom made or commercially available processor, a central processing unit (CPU), an auxiliary processor among several processors associated with the client device 400, a semiconductor-based microprocessor (in the form of a microchip or chip set), or generally any device for executing software instructions. When the client device 400 is in operation, the processor 412 is configured to execute software stored within the memory 422, to communicate data to and from the memory 422, and to generally control operations of the client device 400 pursuant to the software instructions. In an exemplary embodiment, the processor 412 may include a mobile optimized processor such as optimized for power consumption and mobile applications. The I/O interfaces 414 can be used to receive images through a camera or scanner and user input from and/or for providing system output. User input can be provided via, for example, a keypad, a touch screen, a scroll ball, a scroll bar, buttons, bar code scanner, voice recognition, eye gesture, and the like. System output can be provided via a display device such as a liquid crystal display (LCD), touch screen, and the like. The I/O interfaces 414 can also include, for example, a serial port, a parallel port, a small computer system interface (SCSI), an infrared (IR) interface, a radio frequency (RF) interface, a universal serial bus (USB) interface, and the like. The I/O interfaces 414 can include a graphical user interface (GUI) that enables a user to interact with the client device 400. Additionally, the I/O interfaces 414 may further include an imaging device, i.e. camera, video camera, etc.

The radio 416 enables wireless communication to an external access device or network. Any number of suitable wireless data communication protocols, techniques, or methodologies can be supported by the radio 416, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 418 may be used to store data. The data store 418 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 418 may incorporate electronic, magnetic, optical, and/or other types of storage media.

In some preferred embodiments, the client device 400 includes a global positioning system sensor configured to receive latitude and longitude coordinates from satellites (i.e. a GPS signal).

In some other preferred embodiments, the client device 400 includes an accelerometer configured to receive user initiated actions (e.g. shaking the device, moving the device in a pattern, etc.).

The memory 422 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 422 may incorporate electronic, magnetic, optical, and/or other types of storage media. Note that the memory 422 may have a distributed architecture, where various components are situated remotely from one another, but can be accessed by the processor 412. The software in memory 422 can include one or more software programs, each of which includes an ordered listing of executable instructions for implementing logical functions. In the example of FIG. 4, the software in the memory system 422 includes a suitable operating system (O/S) 426 and programs 428. The operating system 426 essentially controls the execution of other computer programs, and provides scheduling, input-output control, file and data management, memory management, and communication control and related services. The operating system 426 may be, for example, LINUX (or another UNIX variant), Android (available from Google), Symbian OS, Microsoft Windows CE, Microsoft Windows 7 Mobile, iOS (available from Apple, Inc.), webOS (available from Hewlett Packard), Blackberry OS (Available from Research in Motion), and the like. The programs 428 may include various applications, add-ons, etc. configured to provide end user functionality with the client device 400. For example, exemplary programs 428 may include, but not limited to, a web browser, social networking applications, streaming media applications, games, mapping and location applications, electronic mail applications, financial applications, and the like. In a typical example, the end user typically uses one or more of the programs 428 along with a network such as the system 100.

Figure 5:
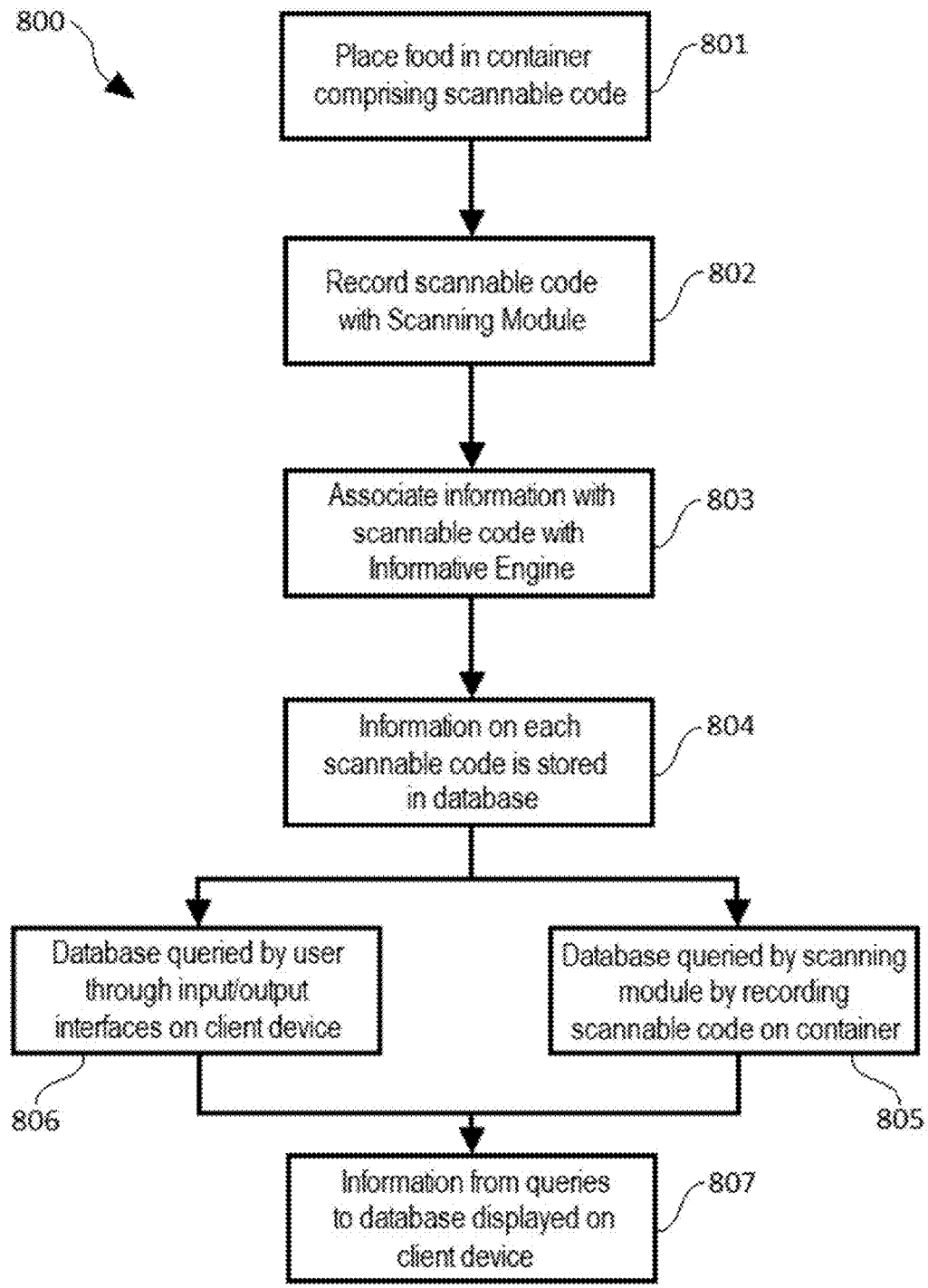
FIG. 5 shows a flow chart that illustrates an example of a process for an informative food storage method according to various embodiments described herein.

Turning now to FIG. 5, a flow chart that illustrates an example of a process for an informative food storage method 800 according to various embodiments is illustrated. In this exemplary method, food may be placed in a container comprising a scannable code 801 or the food may already be in a container comprising a scannable UPC code. The scannable code may then be recorded with the scanning module 802. The informative engine may then associate information with the scannable code 803. The information on each scannable code is stored in a database 804. Optionally, a user may then query the database by using the scanning module to record the scannable code on a container 805, or the user may query the database through the input/output interfaces on a client device 806. The information from the database query may then be displayed on the client device 807.

Figure 6:
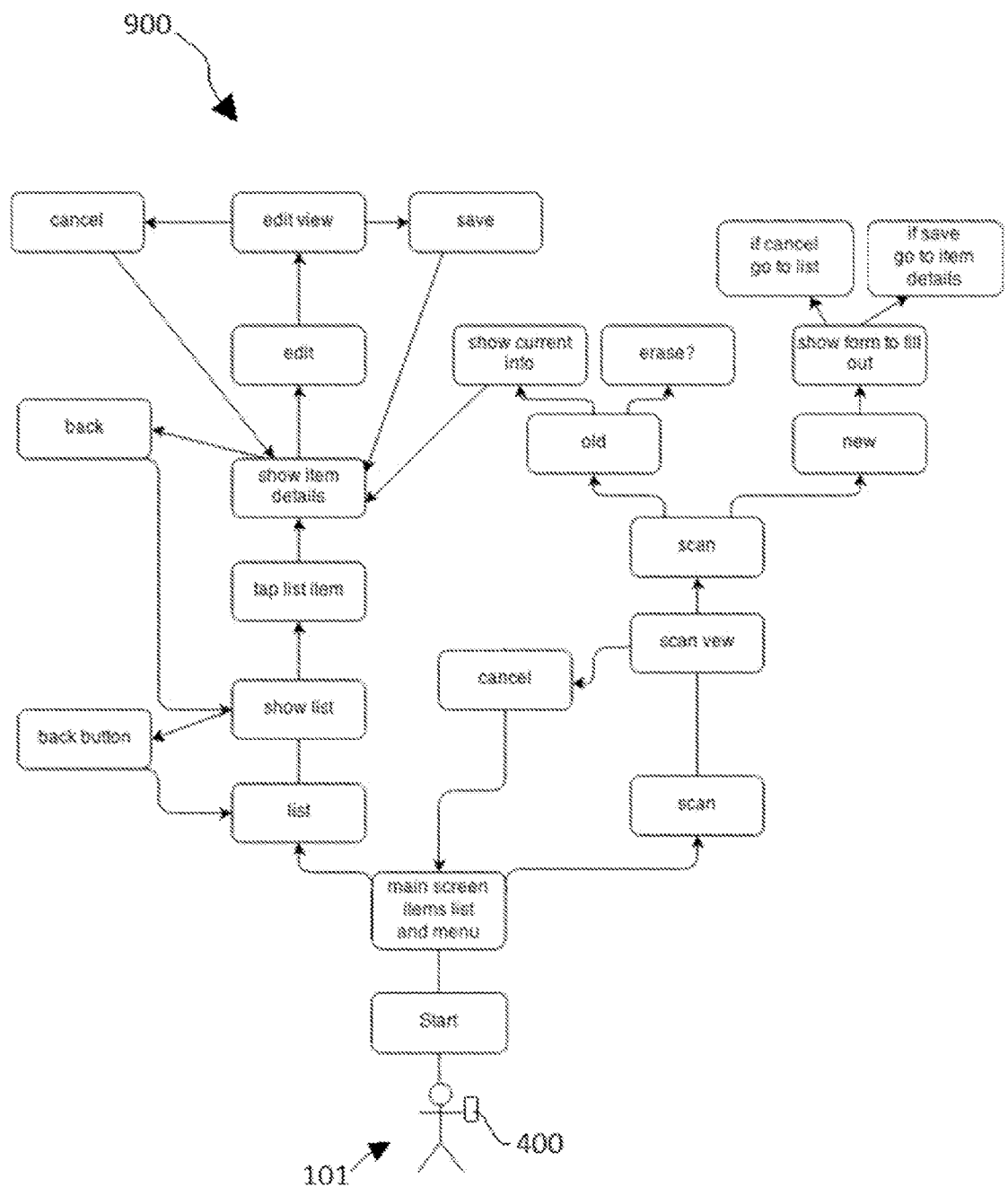
FIG. 6 depicts a flow chart that illustrates an example of a process for an informative food storage system according to various embodiments described herein.

FIG. 6 depicts a flow chart that illustrates an example of a process 900 for an informative food storage system according to various embodiments. In this embodiment, the process 900 may be directed by a user 101 and carried out through the input/output interfaces 404 (FIG. 4) on a client device 400. The process 900 may start on a main screen that presents the user 101 with a list of foods stored in containers and a menu. Items in the list may be selected to display information, image, or video files on the respective item. The user 101 may select to edit the information, image, or video files on the respective item. Next, the user 101 may save the edits or cancel the edits in order to return to the item details display. At any time, the user 101 may select to go back to a previous screen such as a listing of food items screen, a specific food item or container details screen, and/or including all the way back to the main screen.

Also from the main screen, the user 101 may record or scan the scannable code on a container, including UPC scannable codes, with a camera on a client device 400. From the main screen, the user 101 may select to scan which presents the user 101 with a scan view through the camera for capturing a scannable code. If the scannable code is new, meaning the information on the scannable code shows the container comprising the scannable code to be empty or not storing food, the user may be presented with a form to fill out desired information on the food item to be stored in the container and be presented with the ability to set up alerts and reminders. The user 101 may then select to save the information and be presented with the item details, or select to cancel and not save the information allowing the user 101 to then return to the list screen or to return to a previous screen including all the way the main screen.

If the scannable code is old, meaning the information on the scannable code shows the container comprising the scannable code to not be empty and storing food, the user may be presented with information and details associated with the scannable code or the user may select to erase or edit the information and details. The user 101 may then select to return to a previous screen including all the way the main screen.

Figure 7:
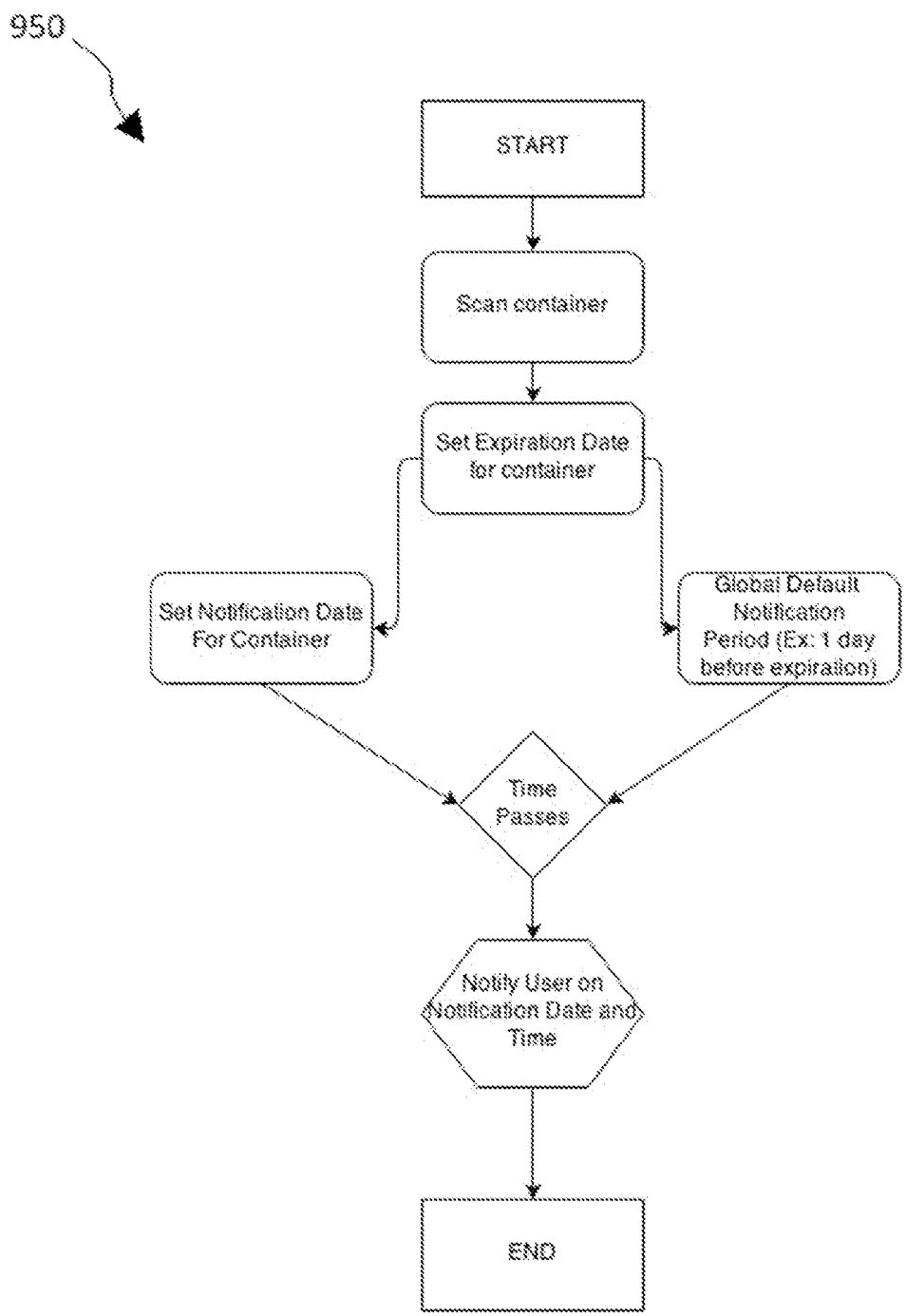
FIG. 7 depicts a flow chart that illustrates an example of a process for an informative food storage system according to various embodiments described herein.

FIG. 7 depicts a flow chart that illustrates an example of a notification process 950 for an informative food storage system according to various embodiments described herein. Various notifications and alarms may be activated on a client device 400 (FIGS. 1, 2, 4, 6) providing information and reminders about food items stored in containers 200 (FIG. 1) including use by dates, food expiration dates, food ripening dates, food storage condition recommendations, food replenishment information, or any other type of notification which may be triggered on a certain date or time. The notification process 950 may begin by scanning the scannable code 250 (FIG. 1) on a container 200 (FIG. 1). The user 101 (FIGS. 1 and 6) may then enter and set the expiration date for the container 200 (FIG. 1) or a recommended expiration date may be set. Once the expiration date has been set, a notification date may be set for the container 200 (FIG. 1) and/or a global default notification period may be set. An example of a global default notification period may be a notification set to trigger one day before the expiration date. The one day notification period is exemplary in nature and any period length may be set including one minute to 10 years or more for extremely long shelf life foods and emergency food rations prior to the expiration date. Once the required time has passed, the user 101 (FIGS. 1 and 6) may be notified by sound, vibration, and/or graphical depictions of the notification date and time on a client device 400 (FIGS. 1, 2, 4, 6) and the notification process 950 may end.

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, solid state drives, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network or the cloud. The relationship of client and server arises by virtue of computer programs running on the respective computers and having a client server relationship to each other.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The computer system may also include a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by processor. In addition, the main memory may be used for storing temporary variables or other intermediate information during the execution of instructions by the processor. The computer system may further include a read only memory (ROM) or other static storage device (e.g., programmable ROM (PROM), erasable PROM (EPROM), and electrically erasable PROM (EEPROM)) coupled to the bus for storing static information and instructions for the processor.

The computer system may also include a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to the computer system using an appropriate device interface (e.g., small computer system interface (SCSI), integrated device electronics (IDE), enhanced-IDE (E-IDE), direct memory access (DMA), or ultra-DMA).

The computer system may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system may also include a display controller coupled to the bus to control a display, such as a cathode ray tube (CRT), liquid crystal display (LCD) or any other type of display, for displaying information to a computer user. The computer system may also include input devices, such as a keyboard and a pointing device, for interacting with a computer user and providing information to the processor. Additionally, a touch screen could be employed in conjunction with display. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system performs a portion or all of the processing steps of the invention in response to the processor executing one or more sequences of one or more instructions contained in a memory, such as the main memory. Such instructions may be read into the main memory from another computer readable medium, such as a hard disk or a removable media drive. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

As stated above, the computer system includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system, for driving a device or devices for implementing the invention, and for enabling the computer system to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code or software code of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

Various forms of computer readable media may be involved in carrying out one or more sequences of one or more instructions to processor for execution. For example, the instructions may initially be carried on a magnetic disk of a remote computer. The remote computer can load the instructions for implementing all or a portion of the present invention remotely into a dynamic memory and send the instructions over the air (e.g. through a wireless cellular network or wifi network). A modem local to the computer system may receive the data over the air and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on storage device either before or after execution by processor.

The computer system also includes a communication interface coupled to the bus. The communication interface provides a two-way data communication coupling to a network link that is connected to, for example, a local area network (LAN), or to another communications network such as the Internet. For example, the communication interface may be a network interface card to attach to any packet switched LAN. As another example, the communication interface may be an asymmetrical digital subscriber line (ADSL) card, an integrated services digital network (ISDN) card or a modem to provide a data communication connection to a corresponding type of communications line. Wireless links may also be implemented. In any such implementation, the communication interface sends and receives electrical, electromagnetic or optical signals that carry digital data streams representing various types of information.

The network link typically provides data communication to the cloud through one or more networks to other data devices. For example, the network link may provide a connection to another computer or remotely located presentation device through a local network (e.g., a LAN) or through equipment operated by a service provider, which provides communication services through a communications network. In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit and receive data, including program code, through the network(s) and, the network link and the communication interface. Moreover, the network link may provide a connection through a LAN to a client device such as a personal digital assistant (PDA), laptop computer, or cellular telephone. The LAN communications network and the other communications networks such as cellular wireless and wifi networks may use electrical, electromagnetic or optical signals that carry digital data streams. The processor system can transmit notifications and receive data, including program code, through the network(s), the network link and the communication interface.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An informative food storage system, the system comprising:
 a client device comprising a scanning module, an upload module, and an informative engine;
 a server with a network link to the client device, wherein the server comprises a database; and
 a container comprising a scannable code,
  wherein the scannable code is recorded by a scanning module on the client device;
  wherein the informative engine:
   determines whether the scannable code is present in the database;
   when the scannable code is not present:
    receives description information from a user input of the client device, the information associated with the scannable code;
    determines an expiration date associated with the scannable code; and
    stores the scannable code, the associated information, and the expiration date in the client device;
   when the scannable code is present:

retrieves the information associated with the scannable code;

determines whether the expiration date associated with the scannable code is past a present date;

alerts the user when the expiration date is past a present date; and displays the information in a user interface of the client device;

wherein the upload module transmits the scannable code, the expiration date and the information associated with the scannable code to the server through the network link.

2. The system of claim 1, wherein the informative engine further:

alerts the user when the present date is within a threshold time before the expiration date.

3. The system of claim 1, wherein the informative engine further receives the expiration date from the user input of the client device.

4. The system of claim 1, wherein the informative engine further recommends an expiration date to the user.

5. The system of claim 1, wherein the informative engine further recommends recipes based on a chronological order of the expiration dates.

* * * * *